(12) United States Patent
Yuasa et al.

(10) Patent No.: US 9,432,220 B2
(45) Date of Patent: Aug. 30, 2016

(54) APPARATUS, METHOD AND SYSTEM TO SELECT CONTENT FROM HISTORY INFORMATION REPRESENTING PREVIOUSLY REPRODUCED CONTENT

(75) Inventors: Naoki Yuasa, Chiba (JP); Takahiro Ushioda, Tokyo (JP); Shuichi Otsu, Kanagawa (JP); Mie Namai, Tokyo (JP)

(73) Assignee: Sony Corporation (JP)

( * ) Notice: Subject to any disclaimer, the term of this patent is extended or adjusted under 35 U.S.C. 154(b) by 1158 days.

(21) Appl. No.: 13/331,482

(22) Filed: Dec. 20, 2011

(65) Prior Publication Data
US 2012/0166594 A1 Jun. 28, 2012

(30) Foreign Application Priority Data
Dec. 28, 2010 (JP) ................. P2010-291988

(51) Int. Cl.
*G06F 17/30* (2006.01)
*H04L 12/66* (2006.01)
*H04L 12/28* (2006.01)

(52) U.S. Cl.
CPC ......... *H04L 12/66* (2013.01); *G06F 17/30837* (2013.01); *G06F 17/30843* (2013.01); *G06F 17/30849* (2013.01); *G06F 17/30861* (2013.01); *G06F 17/30867* (2013.01); *G06F 17/30876* (2013.01); *H04L 12/282* (2013.01); *H04L 12/2812* (2013.01)

(58) Field of Classification Search
CPC .............. G06F 17/30017; G06F 17/30044; G06F 17/30817; G06F 21/10; G06F 17/30837; G06F 17/30861; G06F 17/30867; G06F 17/30786; G06F 17/30849; G06F 17/30843; G06Q 30/02; H04H 20/26; H04N 5/44543; H04N 5/44; H04N 7/17318; G06T 11/206

See application file for complete search history.

(56) References Cited

U.S. PATENT DOCUMENTS 7,426,563 B2 9/2008 Morita et al.
8,837,469 B2 * 9/2014 Sako et al. ............. 370/368
(Continued)

FOREIGN PATENT DOCUMENTS

JP 2003-330827 A 11/2003
JP 2004222046 A 8/2004
(Continued)

OTHER PUBLICATIONS

Office Action from Japanese Application No. 2010-291988, dated Aug. 26, 2014.
(Continued)

*Primary Examiner* — Le H Luu
(74) *Attorney, Agent, or Firm* — Lerner, David, Littenberg, Krumholz & Mentlik, LLP

(57) ABSTRACT

According to an illustrative embodiment, an information processing apparatus is provided. The information processing apparatus includes a storage for storing content identification and content type information in association with each other, the content identification identifying a content that a renderer acquired from a server and reproduced; an input unit for receiving a reproduction request specifying the content type information; and a transmission unit for retrieving the content identification associated with the specified content type information from the storage and transmitting to the renderer an instruction for reproduction, the instruction for reproduction including the content identification.

13 Claims, 12 Drawing Sheets

(56) References Cited

U.S. PATENT DOCUMENTS

| | | | |
|---|---|---|---|
| 2002/0184097 A1* | 12/2002 | Hijiri et al. | 705/14 |
| 2007/0025704 A1* | 2/2007 | Tsukazaki et al. | 386/96 |
| 2007/0039023 A1* | 2/2007 | Kataoka | 725/46 |
| 2007/0053514 A1* | 3/2007 | Imai et al. | 380/204 |
| 2008/0151702 A1 | 6/2008 | Yuasa et al. | |
| 2008/0295036 A1* | 11/2008 | Ikeda | G06T 11/206 715/848 |
| 2009/0198655 A1* | 8/2009 | Kim et al. | 707/3 |
| 2009/0217336 A1 | 8/2009 | Chang et al. | |
| 2011/0004826 A1* | 1/2011 | Cho et al. | 715/716 |
| 2011/0016493 A1* | 1/2011 | Lee et al. | 725/62 |
| 2011/0225417 A1* | 9/2011 | Maharajh et al. | 713/150 |

FOREIGN PATENT DOCUMENTS

| | | |
|---|---|---|
| JP | 2008159139 A | 7/2008 |
| JP | 2008283368 A | 11/2008 |
| JP | 4281798 B2 | 6/2009 |
| JP | 2009194416 A | 8/2009 |
| JP | 2010258778 A | 11/2010 |
| WO | 2009069692 A1 | 6/2009 |

OTHER PUBLICATIONS

Japanese Office Action for JP Application No. 2010291988, dated Mar. 24, 2015.
Chinese Office Action for CN Application No. 201110441053.3, dated Aug. 20, 2015.

* cited by examiner

Reproduction history of renderer 20a

| Content type | Content identification | Server information |
|---|---|---|
| HDD video | Content V3 | Server 30a |
| HDD photo | Content F5 | Server 30a |
| HDD music | Content M7 | Server 30b |

FIG.4

| Action | Acquirable State Variable | Information used for content category judgment |
|---|---|---|
| GetMediaInfo | AVTransportURIMetaData | ·dc:title<br>·Content URI<br>·DLNA.ORG_PN<br>·upnp:class<br>·mime-type<br>·Uniquely-added identification information |
| GetPositionInfo | CurrentTrackMetaData | |

FIG.11A

| DLNA.ORG_PN | Category judgment |
|---|---|
| AC3 | Music |
| ATRAC | |
| LPCM | |
| MP3 | |
| MPEG | Video |
| AVC | |
| WMV | |
| JPEG | Photo |
| PNG | |

FIG.11B

| Unique meta-information | Category judgment |
|---|---|
| CD | CD |
| PC_MUSIC | PC Music |
| LIVE_TUNER | Live streaming |
| INTERNET_RADIO | Internet radio |
| AUDIO_IN | External input |
| BD | BD |
| DVD | DVD |
| TV | TV |

| Content type selection | |
|---|---|
| HDD video | (Content V3) |
| HDD photo | (Content F5) |
| HDD music | (Content M7) |
| Internet radio | (Content I6) |
| External input | (Content E2) |

FIG.13

APPARATUS, METHOD AND SYSTEM TO SELECT CONTENT FROM HISTORY INFORMATION REPRESENTING PREVIOUSLY REPRODUCED CONTENT

CROSS-REFERENCE TO RELATED APPLICATION

The present application claims priority from Japanese Patent Application No. JP 2010-291988 filed in the Japanese Patent Office on Dec. 28, 2010, the entire content of which is incorporated herein by reference.

BACKGROUND

The present disclosure relates to an information processing apparatus, a reproduction control method, a program, and a content reproduction system for controlling a reproduction apparatus to acquire a content via a network and reproduce the content.

In recent years, DLNA (Digital Living Network Alliance (registered trademark)) is known as a standard for constructing residential home networks. By the DLNA standard, digital contents such as a music content and a moving image content are controlled in a home network.

Japanese Patent Application Laid-open No. 2003-330827 (hereinafter, referred to as Patent Document 1) discloses a contents reproducing device that acquires contents from a plurality of servers on a home network and reproduces them. The contents reproducing device stores a previously-connected server based on a past connection history. Then, upon receiving a response to an SD request (Service Discovery Request) for a server search from the server, the contents reproducing device preferentially connects to that server. As a result, a server search time is shortened, and user operability is improved (see, for example, paragraphs [0013] to [0016] and FIG. 3 of Patent Document 1).

In addition, Japanese Patent No. 4281798 (hereinafter, referred to as Patent Document 2) discloses a controller, a server, and a renderer that are connected to a home network that uses the DLNA standard. By a user operating the controller, an operation of the renderer that reproduces contents is controlled (see, for example, paragraphs [0076] and [0124], and FIG. 2 of Patent Document 2).

SUMMARY

Here, a case where a user views a content that has been viewed in the past again will be discussed. The user instructs the renderer to reproduce a content using the controller. Using the technique disclosed in Patent Document 1, a previously-connected server is preferentially connected to the renderer. As a result, while a server search time is shortened, the user may need to re-select a content to be viewed from the plurality of contents stored in the server.

Moreover, there is a case where a plurality of types of contents including a music content and a moving image content are reproduced by a single renderer. In this case, a server search may become necessary again when the user wishes to view a content that is of a different type from a content provided by the previously-connected server.

In view of the circumstances as described above, there is a need for an information processing apparatus, a reproduction control method, a program, and a content reproduction system for enabling a reproduction apparatus that acquires contents via a network and reproduces them to be controlled so that contents that a user have viewed in the past can be viewed again with favorable operability.

In view of the above, the present embodiments are provided. According to an illustrative embodiment, an information processing apparatus is provided. The information processing apparatus includes a storage for storing content identification and content type information in association with each other, the content identification identifying a content that a renderer acquired from a server and reproduced; an input unit for receiving a reproduction request specifying the content type information; and a transmission unit for retrieving the content identification associated with the specified content type information from the storage and transmitting to the renderer an instruction for reproduction, the instruction for reproduction including the content identification.

As described above, according to the embodiments of the present disclosure, control of a reproduction apparatus that acquires contents via a network and reproduces them to enable a content that a user has viewed in the past to be viewed again with favorable operability can be realized.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 4 is a table showing history information according to the first embodiment;

FIG. 11 are diagrams showing examples of tables for acquiring content category information from content meta-information shown in FIG. 9;

FIG. 13 is a diagram showing a modified example of a content type list displayed on the display screen shown in FIG. 7.

DETAILED DESCRIPTION OF EMBODIMENTS

Hereinafter, embodiments of the present disclosure will be described with reference to the drawings.

First Embodiment

Figure 1:
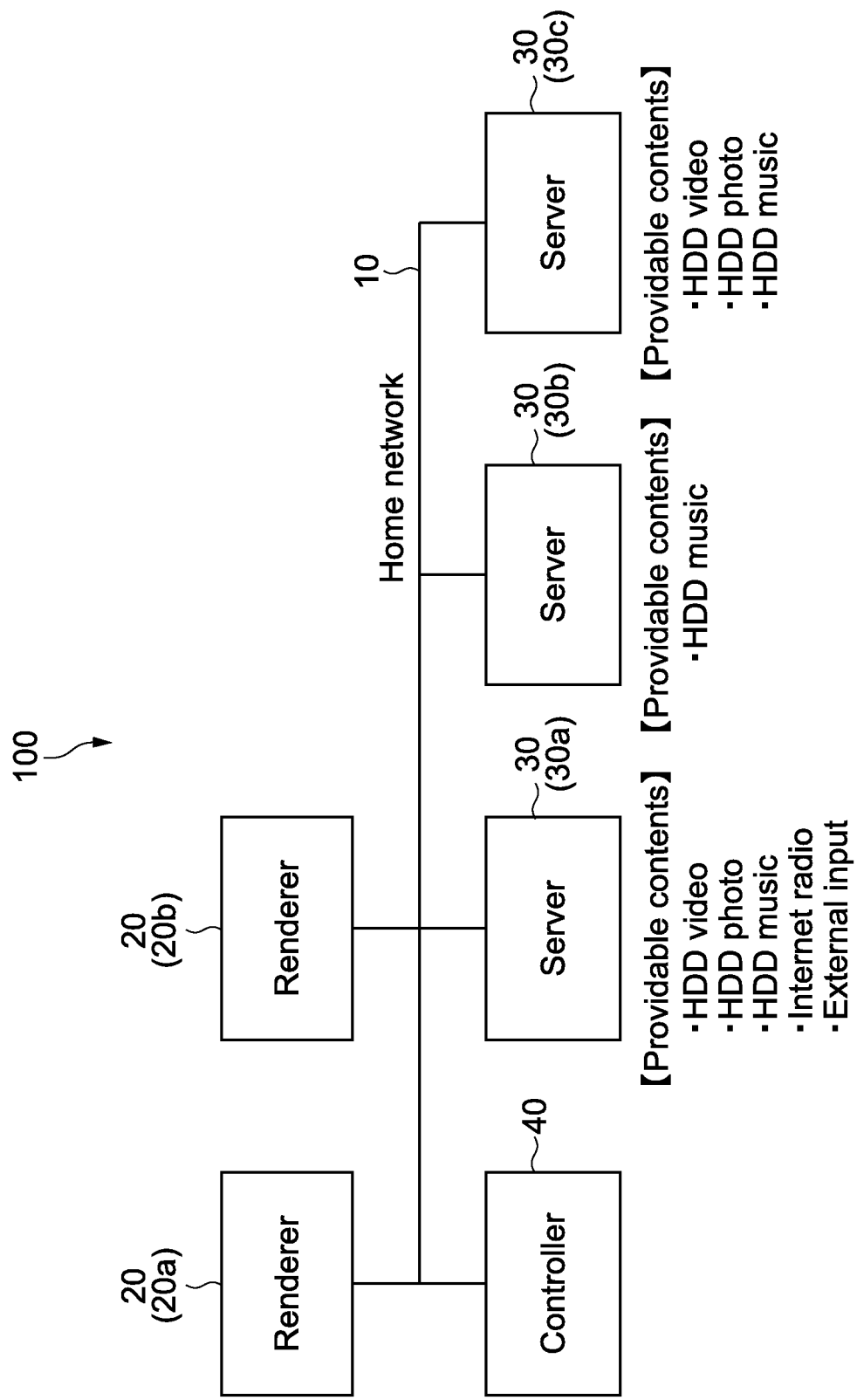
FIG. 1 is a schematic diagram showing a content reproduction system according to a first embodiment of the present disclosure.

FIG. 1 is a schematic diagram showing a content reproduction system according to a first embodiment of the present disclosure. A content reproduction system 100 is a system in which contents are transmitted and received among a plurality of apparatuses mutually connected via a home network 10. In this embodiment, renderers 20 (20a, 20b) as reproduction apparatuses, servers 30 (30a to 30c) as content providing servers, and a controller 40 that instructs the renderers 20 to reproduce contents are connected to the home network 10. The controller 40 corresponds to an information processing apparatus according to the embodiment of the present disclosure.

The home network 10 is a network conforming to the DLNA standard. Therefore, in this embodiment, the renderers 20 each function as a DMR (Digital Media Renderer) of DLNA. Moreover, the servers 30 each function as a DMS (Digital Media Server). The controller 40 functions as a DMC (Digital Media Controller). However, networks using other protocols may be used instead.

The renderers 20 are capable of acquiring contents from the servers 30 via the home network 10 based on a reproduction request from the controller 40 and reproducing them.

The renderers 20 may be capable of operating as a DMP (Digital Media Player) of DLNA. In this case, the renderers 20 acquire contents from the servers 30 based on a reproduction request from a user transmitted via a UI (User Interface) of the renderers themselves, for example, and reproduce them.

Examples of the renderers 20 include a television apparatus, a PC (Personal Computer), an audio video receiver, a video monitor, and a home game apparatus.

The servers 30 transmit list information of a plurality of contents that can be provided by themselves to the controller 40. Moreover, the servers 30 stream designated contents to the renderers 20. It should be noted that the designated contents may be downloaded.

In the servers 30, data of a plurality of contents categorized into a plurality of types based on a predetermined criterion are stored. In this embodiment, the contents are categorized into a plurality of types based on content attribute information. For example, contents are categorized into types of "HDD (Hard Disk Drive) video", "HDD photo", "HDD music", "Internet radio", and "external input".

However, how the content types are determined and how the contents are categorized can be set as appropriate. For example, the contents may be categorized based on an activity name, category name, or function name of the contents. Alternatively, the contents may be categorized based on a data format of the contents or the like.

As shown in FIG. 1, in this embodiment, contents of "HDD video", "HDD photo", "HDD music", "Internet radio", and "external input" are delivered by the server 30a. Contents of "HDD music" are delivered by the server 30b. Contents of "HDD video", "HDD photo", and "HDD music" are delivered by the server 30c.

As each of the servers 30, a PC or an HDD (NAS) compatible with a network is used, for example.

Figure 2:
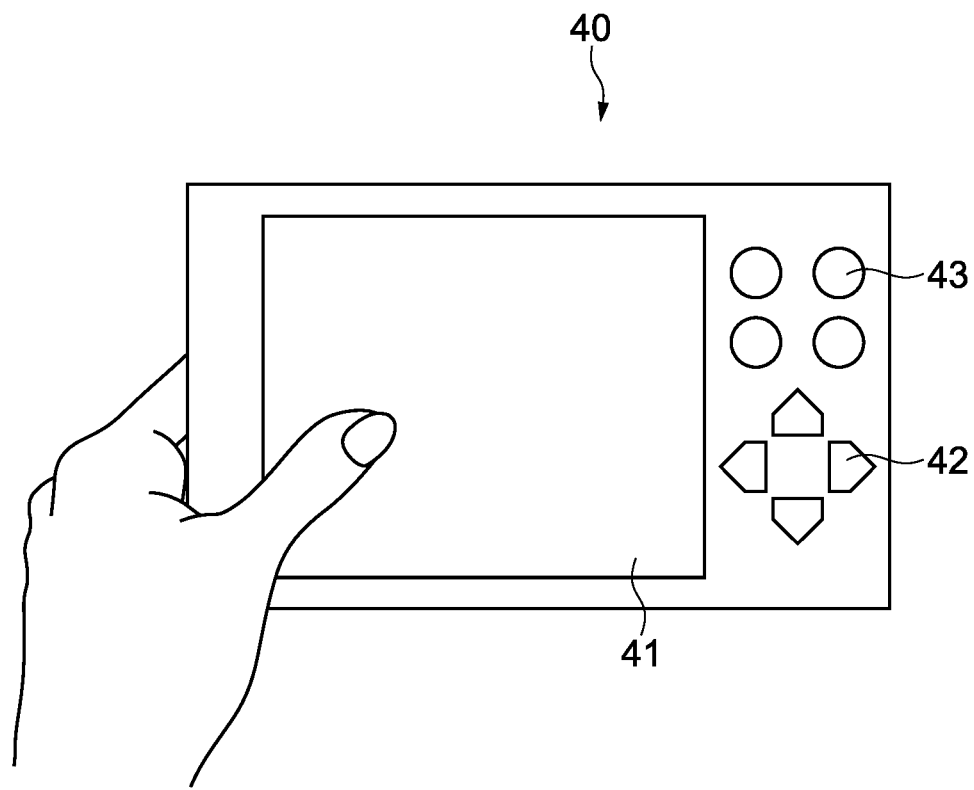
FIG. 2 is a schematic plan view showing an outer appearance of a controller shown in FIG. 1.

FIG. 2 is a schematic plan view showing an outer appearance of the controller 40 according to this embodiment. The controller 40 is of a size that a user is capable of carrying. On the controller 40, a display screen 41 that functions as a touch panel, arrow keys 42, operation buttons 43, and the like are provided.

On the display screen 41, a content list transmitted from the servers 30, GUIs (Graphical User Interfaces) for inputting a reproduction request to the renderers 20, and the like are displayed. By operating the displayed GUI, arrow keys 42, and the like, the user can select a content, instruct the renderer 20 to reproduce the selected content, and the like. The display screen 41, the arrow keys 42, and the like correspond to an input unit according to this embodiment.

Further, as described below, in this embodiment, a reproduction request including at least content type information is input to the input unit. In other words, a type of a content to be reproduced is designated by the user.

As the controller 40, a PDA (Personal Digital Assistants), a game apparatus, or the like is used.

Figure 3:
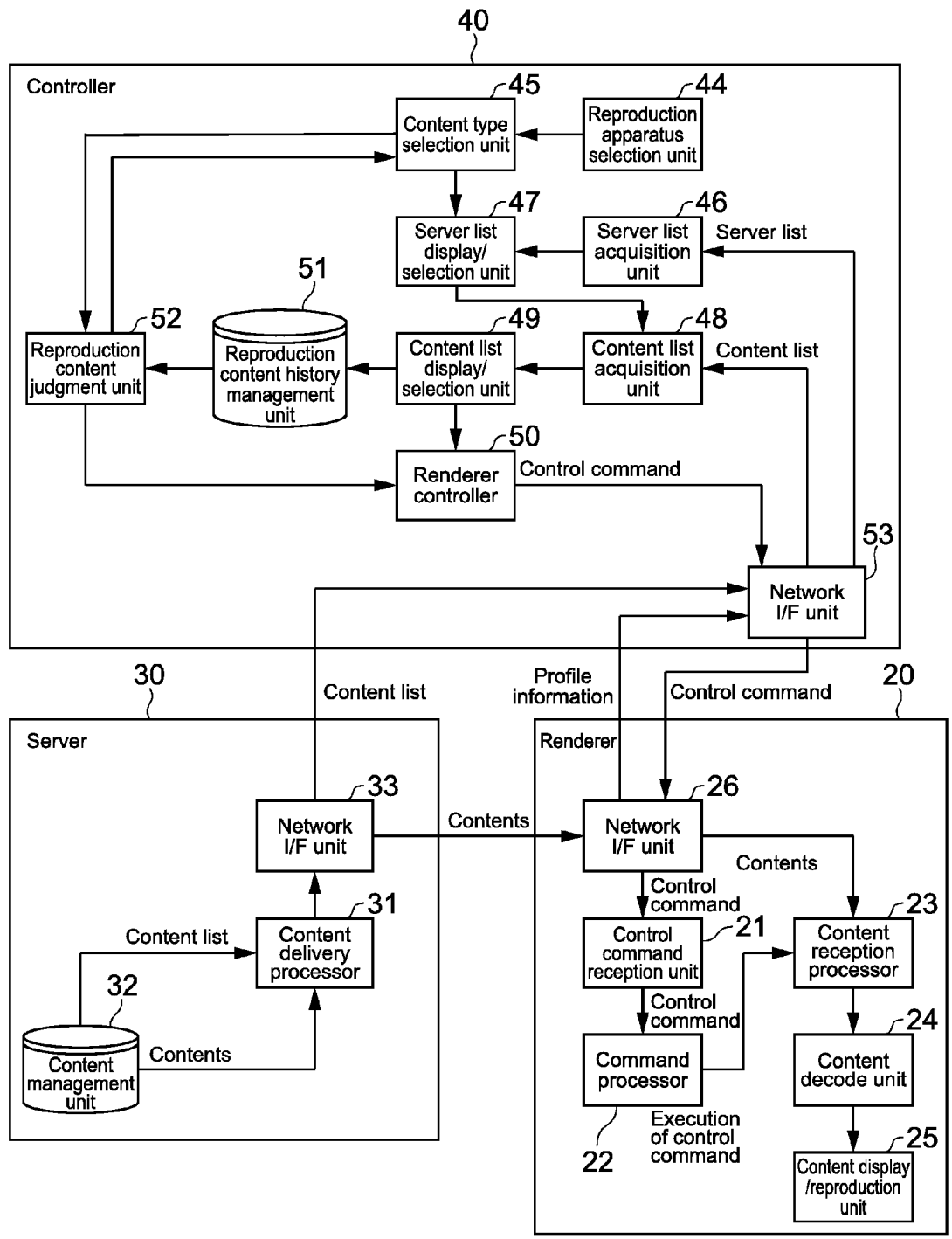
FIG. 3 is a schematic block diagram showing structural examples of a renderer, a server, and the controller shown in FIG. 1.

FIG. 3 is a schematic block diagram showing structural examples of the renderers 20, the servers 30, and the controller 40 shown in FIG. 1.

As shown in FIG. 3, the controller 40 includes a reproduction apparatus selection unit 44, a content type selection unit 45, a server list acquisition unit 46, a server list display/selection unit 47, a content list acquisition unit 48, a content list display/selection unit 49, a renderer controller 50, a reproduction content history management unit 51, a reproduction content judgment unit 52, and a network I/F (Interface) unit 53.

The renderer 20 includes a control command reception unit 21, a command processor 22, a content reception processor 23, a content decode unit 24, a content display/reproduction unit 25, and a network I/F unit 26.

The server 30 includes a content delivery processor 31, a content management unit 32, and a network I/F unit 33.

The reproduction apparatus selection unit 44 of the controller 40 displays a GUI used for selecting the renderer 20 to reproduce a content on the display screen 41. Then, information on the renderer 20 selected by the user is output to the content type selection unit 45 as reproduction renderer information.

The content type selection unit 45 displays, on the display screen 41, a list of content types (e.g., "HDD video" and "HDD photo") that can be reproduced by the reproduction renderer 20. Then, information on the content type selected by the user is output to the server list display/selection unit 47 and the reproduction content judgment unit 52. It should be noted that in this embodiment, the renderer 20 is an apparatus that is capable of reproducing all types of contents from "HDD video" to "external output" described above.

The server list display/selection unit 47 narrows down the servers 30 to those that are capable of delivering contents of the content type selected by the content type selection unit 45 and displays them on the display screen 41 as a server list. For example, profile information of the servers 30 that are present on the home network 10 is acquired by the server list acquisition unit 46. The server list is created based on the profile information. The profile information is information on a corresponding protocol, and the like. Further, content lists of the servers 30 may be acquired so that the server list is created based on the content lists.

The content list acquisition unit 48 acquires a list of contents that the server 30 selected by the user provides. The content list acquisition unit 48 transmits, via the network I/F unit 53, a content acquisition request to the content delivery processor 31 of the server 30. The content delivery processor 31 that has received the request receives the content list from the content management unit 32 and transmits it to the content list acquisition unit 48 of the controller 40. The acquired content list is output to the content list display/selection unit 49.

The content list display/selection unit 49 narrows down contents matching the content type selected by the content type selection unit 45 based on a tree structure of the content list or content meta-information and displays the contents on the display screen 41 as a list. Then, identification information of the content selected by the user and information on the reproduction renderer 20 and server 30 that provides the content are output to the renderer controller 50 and the reproduction content history management unit 51.

The content identification information is information for identifying one or more contents to be reproduced by the renderer 20. In this embodiment, a content ID or a content URI (Uniform Resource Identifier) is used as the content identification information, though not limited thereto. As the information on the renderer 20 and the server 30, information such as an IP address or UDN (Uniform Device Name) of each apparatus is used.

The renderer controller 50 transmits a reproduction control command to the control command reception unit 21 of the renderer 20 via the network I/F unit 53. The reproduction control command is an instruction to acquire a content from the server 30 that provides the content and reproduce it and includes content identification information and server information.

The reproduction content history management unit 51 creates history information of a content that has been selected by the user and reproduced by the renderer 20 and stores it. The history information is information in which content identification information and type information indicating a type of the content (e.g., "HDD video") are associated with each other. The reproduction content history management unit 51 corresponds to a storage according to this embodiment.

FIG. 4 is a table showing history information according to this embodiment. In this embodiment, history information in which content identification information and information on the server 30 that stores the content are associated with each other in addition to content type information is created.

Although FIG. 4 shows the table of history information on the renderer 20a, history information on the renderer 20b is also created and stored. In other words, history information is created and stored for each of the plurality of renderers 20 connected to the home network 10.

Moreover, in this embodiment, information in which identification information of a lastly-reproduced content and content type information are associated with each other is stored as the history information for each content type.

The reproduction content judgment unit 52 shown in FIG. 3 judges whether a content of the selected content type has been reproduced in the past by the selected renderer 20. Based on content type information included in a reproduction request received from the user, the reproduction content judgment unit 52 searches for history information of the reproduction content history management unit 51. Accordingly, whether a content of the selected content type has been reproduced in the past is judged.

When there is a content reproduction history, a content that has been reproduced in the past is judged as a content to be reproduced. Then, content identification information and server information included in the history information are output to the renderer controller 50, and a reproduction control command is transmitted to the renderer 20. When there is no content reproduction history, processing of selecting the server 30 and a content is executed, and history information is created by the reproduction content history management unit 51. The reproduction content judgment unit 52 and the renderer controller 50 correspond to an instruction transmission unit according to this embodiment.

The control command reception unit 21 of the renderer 20 receives the reproduction control command transmitted from the controller 40. The command processor 22 receives the reproduction control command from the control command reception unit 21 and instructs the content reception processor 23 to start the streaming reproduction.

The content reception processor 23 transmits a content delivery request to the content delivery processor 31 of the server 30 via the network I/F unit 26. The content delivery processor 31 that has received the request receives the content from the content management unit 32 and transmits it to the content reception processor 23 of the renderer 20.

The content decode unit 24 decodes the stream received from the content reception processor 23 and outputs it to the content display/reproduction unit 25. Then, the content is reproduced by the content display/reproduction unit 25.

Figure 5:
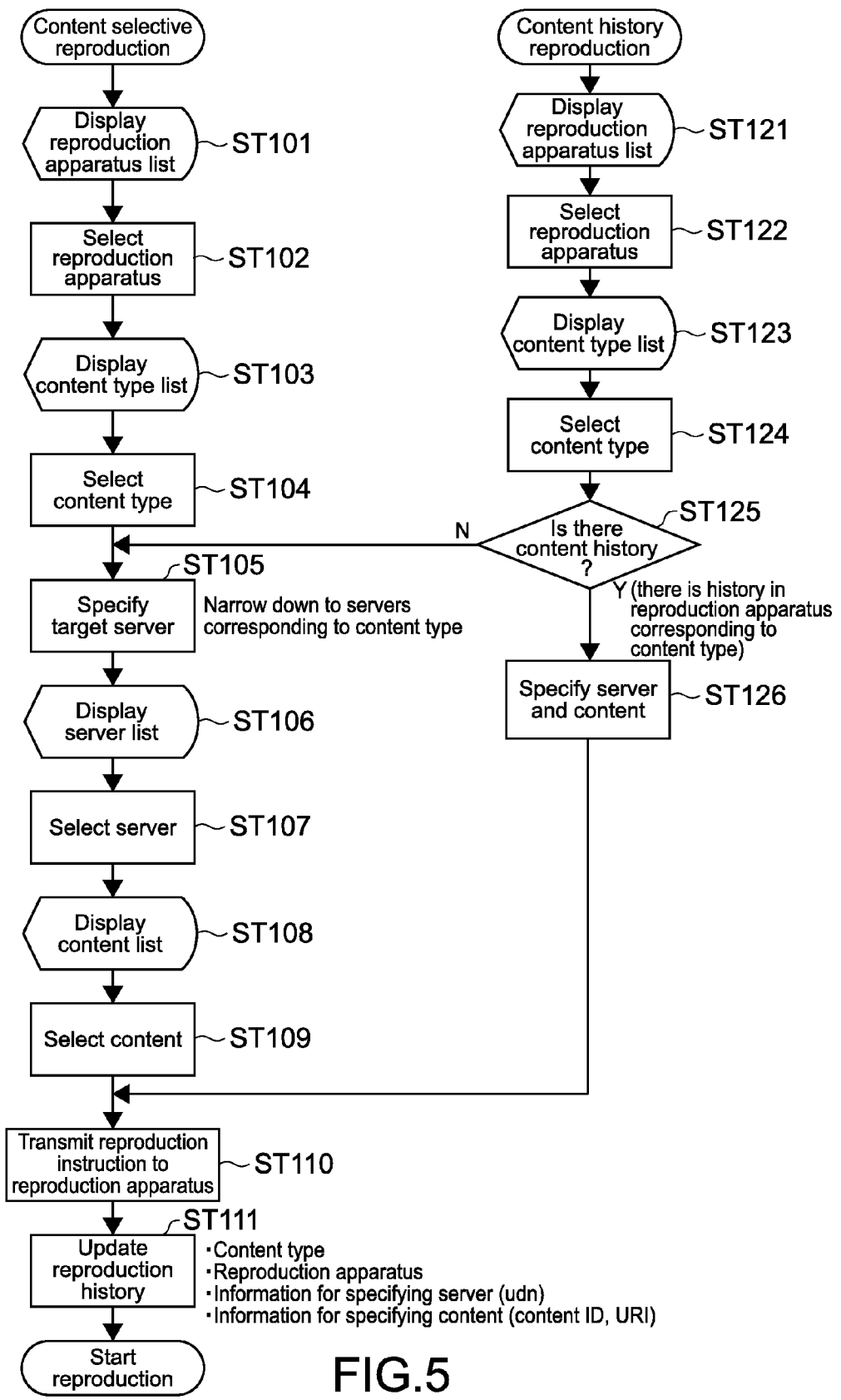
FIG. 5 is a flowchart showing an operation of the controller shown in FIG. 1.
Figure 6:
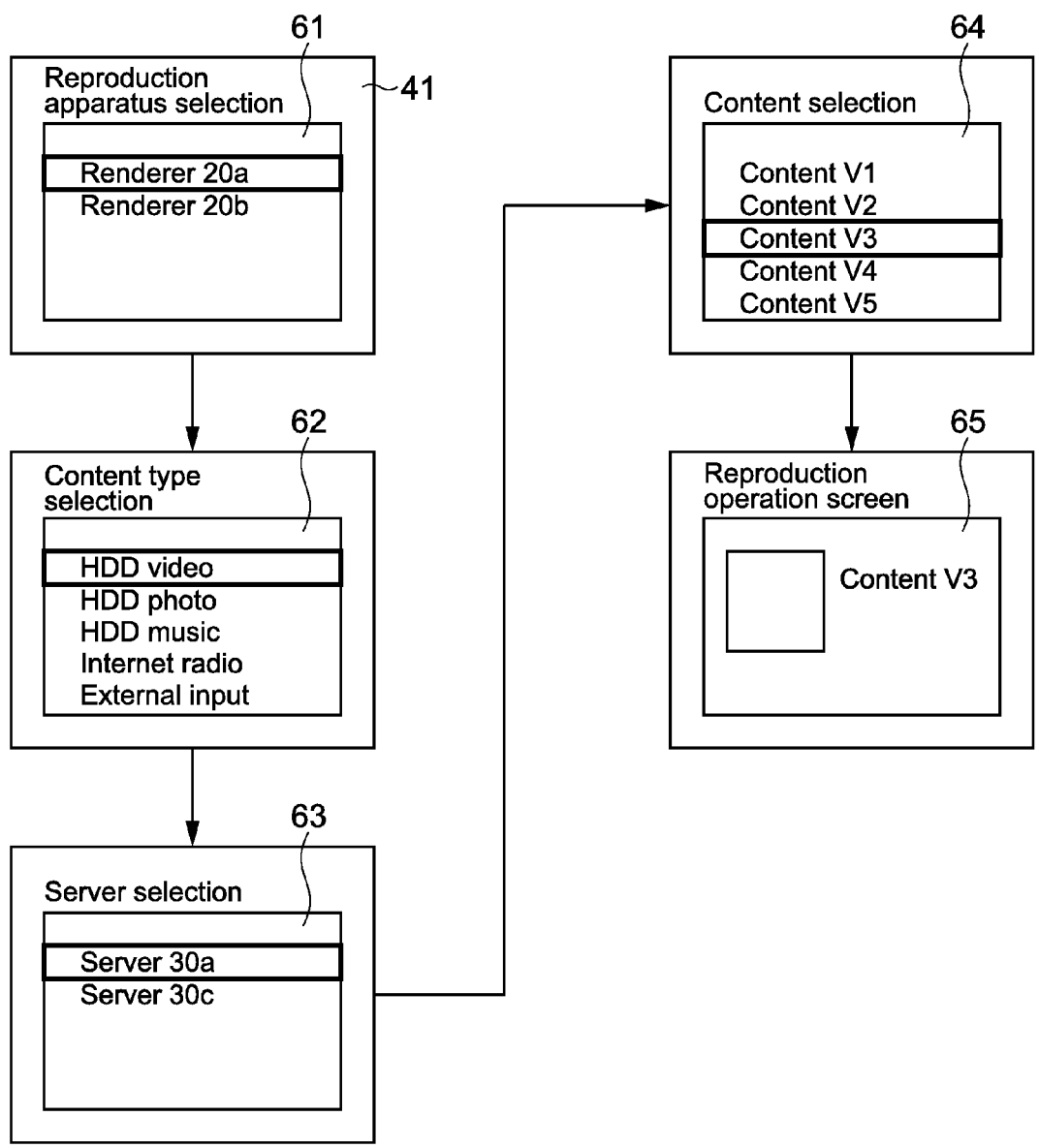
FIG. 6 is a schematic diagram showing a display screen of the controller shown in FIG. 2.
Figure 7:
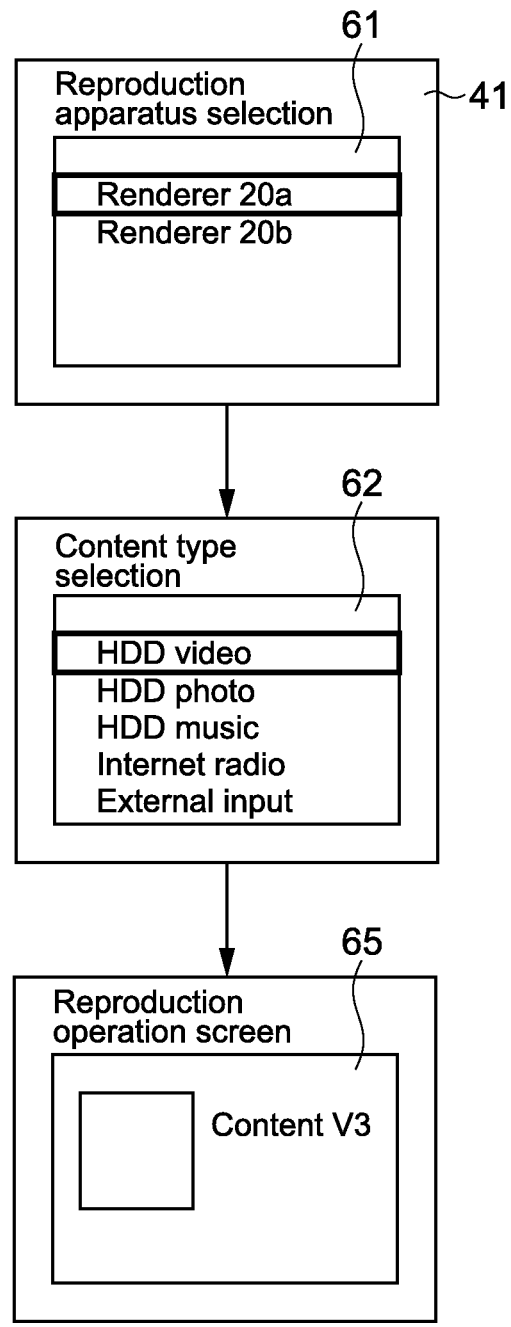
FIG. 7 is a schematic diagram showing the display screen of the controller shown in FIG. 2.

FIG. 5 is a flowchart showing an operation of the controller 40 as the information processing apparatus according to this embodiment. FIGS. 6 and 7 are schematic diagrams showing the display screen 41 of the controller 40.

First, a case where a content is selected by the user and the content is reproduced by the renderer will be described. This is an operation carried out in a case where a content has not been reproduced in the past regarding the content type selected by the user, and there is no reproduction history.

As shown in FIG. 6, a reproduction apparatus list 61 is displayed on the display screen 41 (Step 101), and a reproduction renderer 20a is selected by the user (Step 102). A content type list 62 of contents that can be reproduced by the renderer 20a is displayed on the display screen 41 (Step 103). Then, "HDD video" is selected as the content type (Step 104).

The servers 30 are narrowed down to those that are capable of delivering contents belonging to "HDD video" (Step 105), and a server list 63 indicating the servers 30a and 30c are displayed (Step 106). Then, the server 30a is selected by the user (Step 107).

A content list 64 that shows only contents belonging to "HDD video" that have been narrowed down from the plurality of contents that can be delivered by the server 30a is displayed on the display screen 41 (Step 108). When a content $V_3$ is selected by the user (Step 109), a reproduction control command is transmitted to the renderer 20a (Step 110). As a result, the content $V_3$ is reproduced by the renderer 20a.

On the display screen 41 of the controller 40, a reproduction operation screen 65 used for inputting instructions of pause, fast-forward, and the like is displayed. Further, the table of history information shown in FIG. 4 is created and stored by the reproduction content history management unit 51 shown in FIG. 3. As a result, a reproduction history of the contents belonging to "HDD video" in the renderer 20a is updated (Step 111).

Next, a case where there is a content reproduction history will be described. Here, an example of a case where a reproduction request of the content $V_3$ is input again by the user will be described.

As shown in FIG. 7, the reproduction apparatus list 61 is displayed on the display screen 41, and the renderer 20a is selected (Steps 121 and 122). Then, the content type list 62 is displayed on the display screen 41, and "HDD video" is selected (Steps 123 and 124).

The reproduction content judgment unit 52 shown in FIG. 3 judges whether there is a reproduction history of contents belonging to "HDD video" in the renderer 20a (Step 125). The table shown in FIG. 4 is stored in the reproduction content history management unit 51, and the content $V_3$ and the server 30a are specified based on the table (Step 126).

In Step 110, a reproduction control command that instructs to acquire the content $V_3$ from the server 30a and reproduce it is transmitted to the renderer 20a. In the update processing of Step 111, identification information of the content $V_3$ and information on the server 30a may be newly created as the history information. Alternatively, the processing of updating a reproduction history does not need to be carried out when reproduction control based on history information is carried out.

In the controller 40 as the information processing apparatus of this embodiment, history information in which identification information of the content $V_3$ that has been reproduced by the renderer 20a and type information of the content $V_3$ ("HDD video") are associated with each other is stored. When a reproduction request including at least the content type information is input, history information is searched for based on the content type information, and the content $V_3$ to be reproduced is judged. Then, a reproduction instruction including the identification information of the content $V_3$ to be reproduced is transmitted to the renderer 20a via the home network 10.

Therefore, for the content $V_3$ whose past reproduction history is stored, reproduction can be started by merely selecting the content type. In other words, the sever selection and content selection by the user can be omitted. As a result, control to view a content that the user has viewed in the past again with favorable operability can be realized.

In this embodiment, history information is created and stored for each of the renderers 20a and 20b connected to the home network 10. As a result, control of the renderers 20a and 20b connected to the home network 10 to view a content that the user has viewed in the past again with favorable operability can be realized.

In this embodiment, the reproduction content history management unit 51 stores, as history information, information in which identification information of a lastly-reproduced content and content type information are associated with each other for each content type. Therefore, it becomes possible for the user to again view a content that has been viewed last with favorable operability for each content type. In other words, even when the content that has been viewed last belongs to "HDD music", a content belonging to "HDD video", that has been viewed last before that content can be viewed again with ease.

Moreover, in this embodiment, information on the server 30 is also stored in the reproduction content history management unit 51 as information associated with content identification information. Then, a reproduction control command including the content identification information and information on the server 30 is transmitted to the renderer 20. As a result, a time required for carrying out content reproduction processing by the renderer 20 is shortened. Consequently, user operability is improved.

Moreover, the reproduction processing can be started at a time point the renderer 20 or the server 30a included in the history information is found on the home network 10. Therefore, there is no need to wait for a response from other renderers 20 and servers 30, with the result that a time required for starting reproduction can be shortened.

Second Embodiment

A controller as an information processing apparatus according to a second embodiment of the present disclosure will be described. In descriptions below, descriptions on parts having the same structures and operations as those of the content reproduction system 100 and controller 40 described in the above embodiment will be omitted or simplified.

The controller 240 of this embodiment is capable of acquiring identification information of a content that is being reproduced by the renderer 20 and type information of the content. Based on the acquired content identification information and content type information, history information stored in the reproduction content management unit can be updated. For example, an update unit as a block that carries out the processing described above is provided in addition to the blocks shown in FIG. 3.

Figures 8, 9:
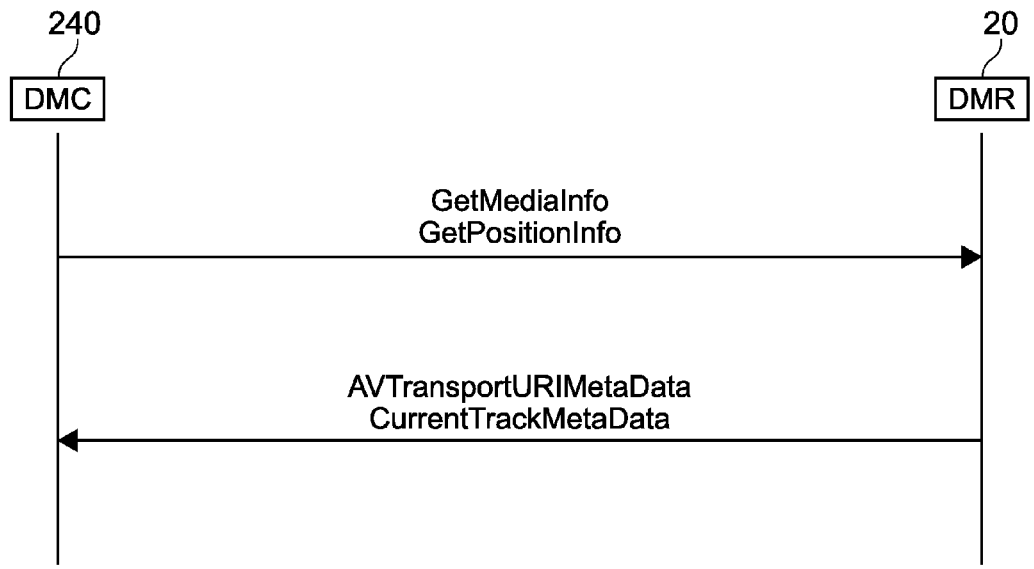
FIG. 8 is a sequence diagram showing an example of control between the controller and the renderer connected to a home network according to a second embodiment of the present disclosure.
FIG. 9 is a diagram for explaining information that can be acquired by the controller by the control sequence shown in FIG. 8.

FIG. 8 is a sequence diagram showing an example of control between the controller 240 of this embodiment and the renderer 20 connected to the home network. FIG. 9 is a diagram for explaining information that can be acquired by the controller 240 by the control sequence shown in FIG. 8.

As shown in FIGS. 8 and 9, "GetMediaInfo" or "GetPositionInfo" is transmitted from the controller 240 to the renderer 20 as a UPnP (Universal Plug and Play) control message.

As a response to the message, "AVTransportURIMetaData" or "CurrentMetaData" is transmitted from the renderer 20 to the controller 240. As shown in FIG. 9, the information returned from the renderer 20 includes meta-information on contents such as a content name, a content URI, and DLNA.ORG_PN. Based on the content meta-information, information necessary for updating history information that includes content identification information and content type information is acquired.

Figure 10:
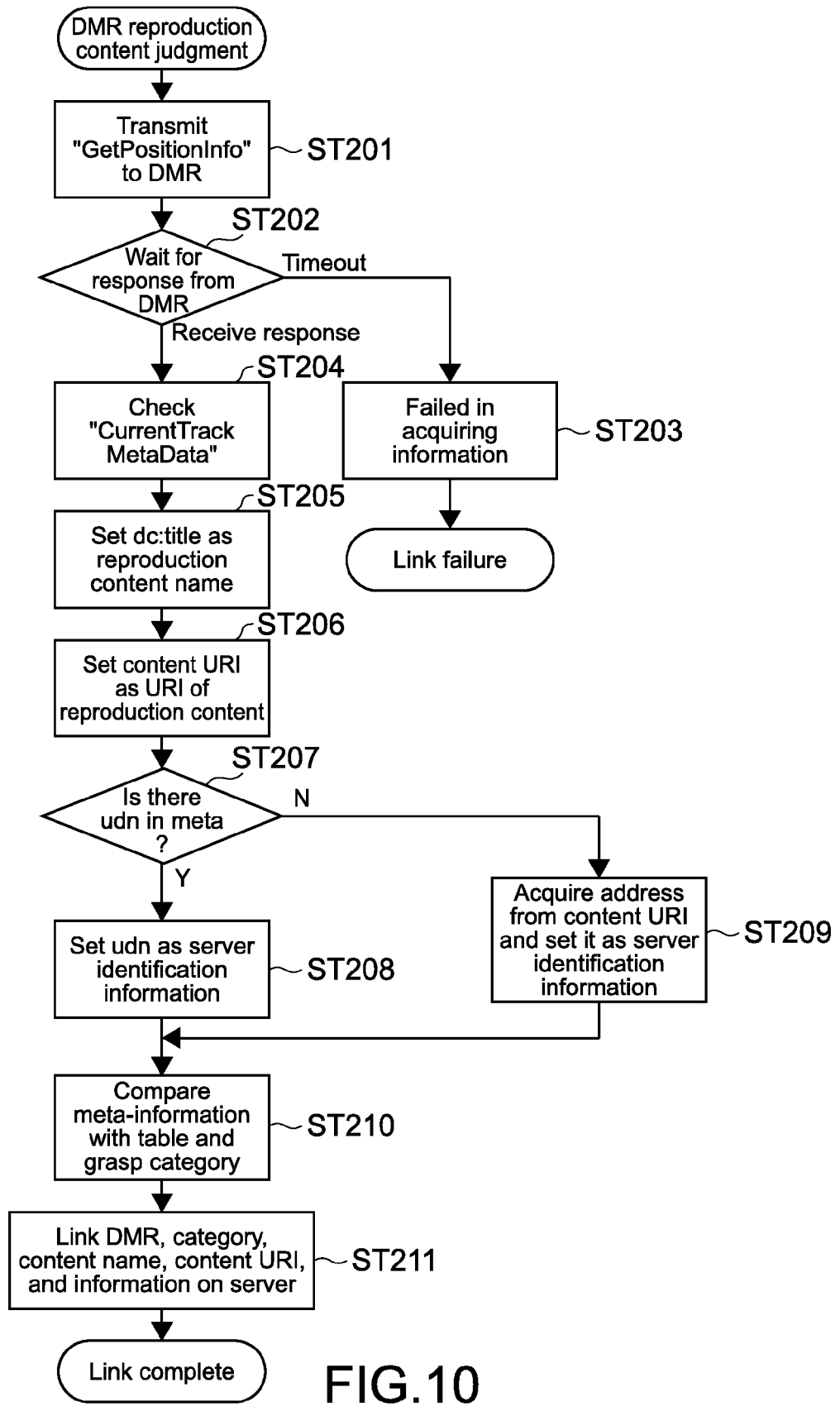
FIG. 10 is a flowchart showing an example of processing carried out by the controller according to the second embodiment for acquiring information necessary for updating history information.

FIG. 10 is a flowchart showing an example of processing carried out by the controller 240 for acquiring information necessary for updating history information based on the content meta-information shown in FIG. 9.

"GetPositionInfo" is transmitted to the renderer 20 (Step 201), and whether a response from the renderer 20 is made within a predetermined time is judged (Step 202). Upon reaching timeout with no response from the renderer 20, an acquisition of content meta-information is judged to have failed, and processing is ended (Step 203).

When a response is made by the renderer 20, content meta-information included in "CurrentMetaData" from the renderer 20 is checked (Step 204). dc:title as the content meta-information is acquired as information on a name of a content that is being reproduced (Step 205). Moreover, a content URI is acquired as URI of the content that is being reproduced (Step 206). In this embodiment, information on a content name and a content URI are acquired as content identification information.

Whether a UDN of a server that has provided the content that is being reproduced is included in the content meta-information is judged (Step 207). When a server UDN is included in the content meta-information, the UDN is acquired as information for identifying a server (Step 208). The server UDN may be added by the server as unique meta-information. The server UDN may be acquired by reproduction of PlayContainer.

When a server UDN is not included in the content meta-information, address information is acquired from the content URI acquired in Step 206. Then, the address information is acquired as server identification information (Step 209). It should be noted that by using the content URI, a content can be acquired from the server to be reproduced. Therefore, the server identification information does not need to be acquired. However, by acquiring the server identification information, processing of displaying server information on a display screen of the controller 240 or displaying content lists of servers becomes possible as appropriate.

By referring to the tables to be described later, content category information is acquired from the content meta-information (Step 210). In this embodiment, content category information is acquired as the content type information.

FIG. 11 are diagrams showing examples of tables for acquiring content category information from content meta-information. FIG. 11A is a table for judging a category based on DLNA.ORG_PN as content meta-information. A table of a profile defined by DLNA as DLNA.ORG_PN and a category corresponding thereto may be used instead.

The value of DLNA.ORG_PN becomes a value like "MPEG_PS_NTSC", for example, but focusing on the first half portion as shown in FIG. 11 (MPEG in this example), the profile may be judged based on a match on the front side. Accordingly, the table may be simplified.

When ARIB.OR.JP_PN, profile information that uniquely defines an apparatus vendor, or the like is defined in addition to DLNA.ORG_PN, a category corresponding to the profile may be judged using the same tables as those shown in FIG. 11. It should be noted that the idea described herein is also applicable to a category judgment of contents based on mime-type as the content meta-information shown in FIG. 9.

FIG. 11B is a table for judging a category of contents based on meta-information uniquely added by the server. Meta-information that the controller 240 can acquire from the renderer 20 is based on information that the renderer 20 has acquired from the server that delivers the contents. Therefore, it is also possible for unique content meta-information to be added at a time point a content is provided by the server, for example, and a content category to be judged based on the content meta-information acquired from the renderer 20.

As shown in FIG. 11B, the content category can be judged more specifically since it is based on the content meta-information uniquely added by the server. Accordingly, the user can view a content that has been viewed in the past again with favorable operability for each of the specifically-categorized content types (category in this example).

In Step 211 of FIG. 10, the information on the renderer 20 that has returned "CurrentMetaData" to the controller 240, the category information, the information on a content name, the content URI, and the server identification information are linked. Based on those pieces of information, history information stored in the reproduction content history management unit is updated.

For example, there are a case where a content is reproduced based on a reproduction instruction from another controller connected to the home network and a case where a content is reproduced with the renderer functioning as a DMP. In such cases, by appropriately updating history information, the user can reliably view the content again.

The series of processing executed by the controllers 40 and 240 according to the first and second embodiments above may be executed either by hardware or software. When causing software to execute the series of processing, a computer in which a program constituting the software is incorporated into dedicated hardware is used, for example. Alternatively, a program is installed from a program recording medium to a computer that is capable of executing the series of processing by installing various programs.

Figure 12:
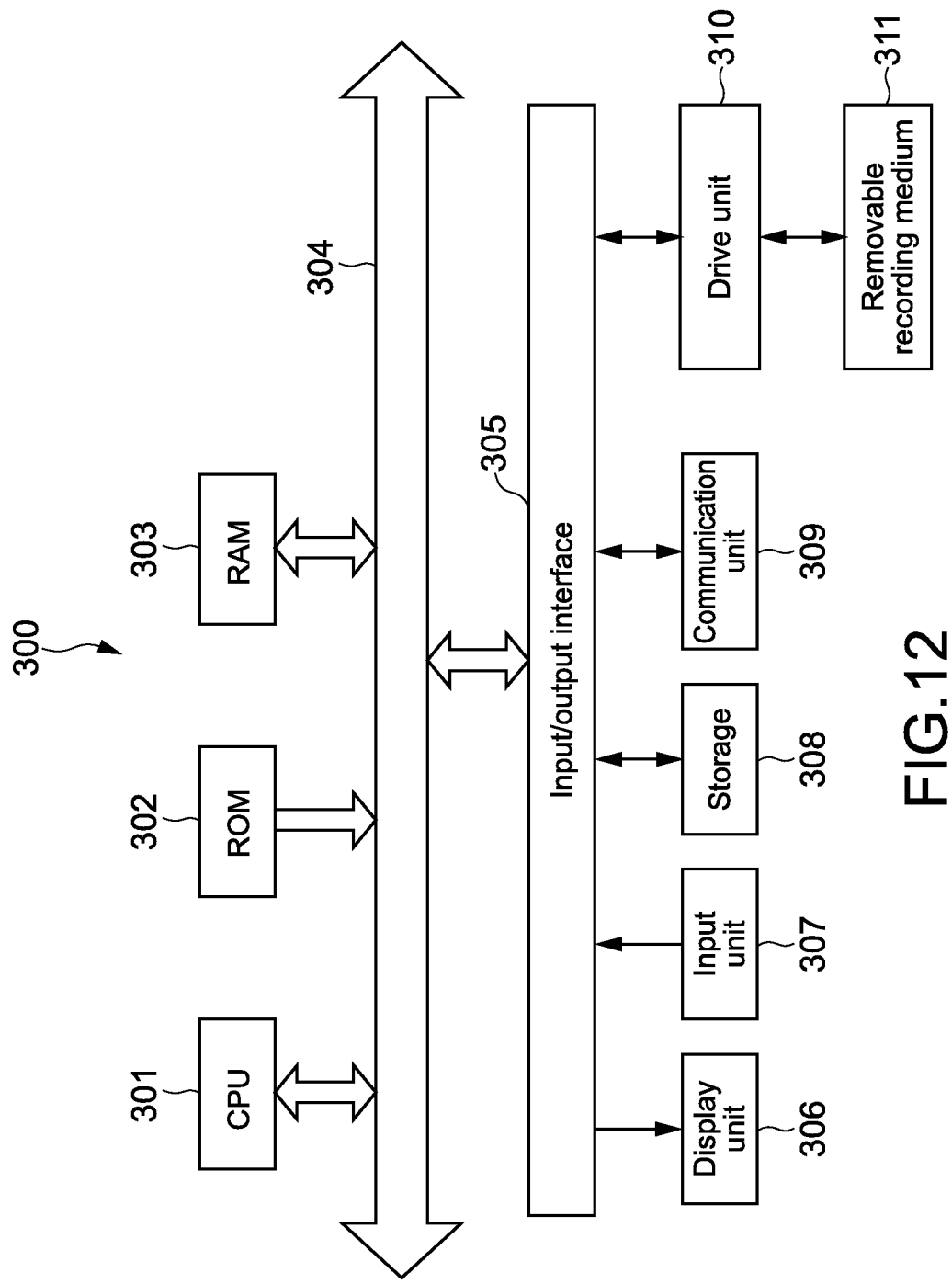
FIG. 12 is a block diagram showing a structural example of a computer that executes a series of processing executed in the first and second embodiments by a program.

FIG. 12 is a block diagram showing a structural example of a computer that executes the series of processing described above. The series of processing described above may be executed by a computer that has the following hardware structure instead of the controller 40 shown in FIG. 2.

A computer 300 includes a CPU (Central Processing Unit) 301, a ROM (Read Only Memory) 302, a RAM (Random Access Memory) 303, an input/output interface 305, and a bus 304 for mutually connecting those components.

Connected to the input/output interface 305 are a display unit 306, an input unit 307, a storage 308, a communication unit 309, a drive unit 310, and the like. The display unit 306 is a display device that uses, for example, liquid crystal, EL (Electro-Luminescence), and CRT (Cathode Ray Tube). The input unit 307 is, for example, a pointing device, a keyboard, a touch panel, or other operation apparatuses. When the input unit 307 includes a touch panel, the touch panel may be integrated with the display unit 306.

The storage 308 is a nonvolatile storage device such as an HDD (Hard Disk Drive), a flash memory, and other solid state memories. The drive unit 310 is a device capable of driving a removable recording medium 311 such as an optical recording medium, a floppy (registered trademark) disk, a magnetic recording tape, and a flash memory. In contrast, the storage 308 is often used as a device that is mounted on the computer 300 in advance, for mainly driving an unremovable recording medium.

The communication unit 309 is a modem, a router, or other communication apparatuses connectable with the LAN (Local Area Network), the WAN (Wide Area Network), and the like for communicating with other devices. The communication unit 309 may communicate with other devices either by wires or wirelessly. The communication unit 309 is often used separate from the computer.

Data processing by the computer 300 is realized by software stored in the storage 308, the ROM 302, or the like in cooperation with hardware resources of the computer. Specifically, by the CPU 301 loading and executing the program that is stored in the storage 308, the ROM 302, or the like and constitutes software in the RAM 303, various types of data processing are realized.

Modified Example

The embodiment of the present disclosure is not limited to the embodiments above and may be variously modified.

For example, in the above embodiments, a reproduction control command of the content $V_3$ is transmitted to the renderer 20a when it is judged in Step 125 of FIG. 5 that there is a reproduction history of the content $V_3$. However, whether to reproduce the content $V_3$ may be judged by the user before the reproduction control command is transmitted.

For example, a popup window of, for example, "There is a content of the selected content type that has been reproduced in the past. Do you wish to reproduce the content?" may be displayed on the display screen 41 of the controller 40. As a result, reproduction control of favorable operability is realized when a content different from the content $V_3$ that the user has viewed in the past is to be viewed.

FIG. 13 is a diagram showing a modified example of the content type list 62 displayed on the display screen 41 shown in FIG. 7. As shown in the figure, the content type list 62 may display a name of a content that has been reproduced in the past for each content type. Accordingly, the user can grasp a content to be reproduced by selecting the content type by visually checking the content type list. As a result, user operability is improved.

Furthermore, identification information of a lastly-reproduced content has been stored as the history information for each content type. However, history information of a plurality of contents may be stored for each content type. For example, identification information of not only the lastly-reproduced content but also a content that has been reproduced before that and also a content before that may be stored for each content type.

In this case, after the content type is selected, a list of the plurality of contents belonging to the content type, that have been reproduced in the past, is displayed on the display screen. The user selects a content that he/she wishes to view again from the displayed list of contents. Accordingly, an operation of selecting and reproducing a content that the user wishes to view most from the contents that have been reproduced in the past becomes possible, for example.

Moreover, in Steps 101 to 109 of FIG. 5, the content has been selected by selecting the renderer, the content type, and the server in the stated order. However, the order is not limited to this order. For example, a content may be selected by selecting the content type, the server, and the renderer in the stated order.

Further, the renderer selection processing of Step 121 of FIG. 5 may be omitted. For example, the renderer that has lastly received a reproduction control command from the controller may be used as a default renderer. As a result, the renderer selection processing can be omitted.

Furthermore, when a server to provide a content is not found when a content reproduction instruction is transmitted to the renderer based on history information, another server capable of delivering a content belonging to the content type selected by the user may be displayed on the display screen of the controller. As a result, a content of the same content type can be viewed swiftly when a server that is to be connected first is not activated, for example.

The controllers of the above embodiments may operate as an IR remote controller equipped with a macro function. Accordingly, it becomes possible for the user to also control an apparatus that is not connected to the home network by operating the controller.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus connectable to a reproducing system having a number of servers and a number of renderers, said apparatus comprising:
 a storage to create history information for at least one renderer and to store the created history information, in which the history information for a respective renderer is based on content that has been previously reproduced by the respective renderer and includes information of (i) content type, (ii) content identification of the content, and (iii) server identification which identifies a server having stored therein the respective content, arranged in association with each other;
 an input unit to enable a user to input a reproduction request for a desired renderer which specifies at least a desired content type; and
 a transmission unit to retrieve the content identification for desired content associated with the desired content type for the desired renderer from the storage and transmit to the desired renderer a reproduction instruction which includes the retrieved content identification and the server identification wherein the desired content is stored.

2. The apparatus as recited in claim 1, in which for the history information of at least one said renderer, the storage is configured to store the history information for only a most recently reproduced content for each said content type.

3. The apparatus as recited in claim 1, in which for the history information of at least one said renderer, the storage is configured to store the history information for a plurality of contents for each content type.

4. The apparatus as recited in claim 1, in which the content identification is determined by the apparatus based on information received from the respective renderer.

5. The apparatus as recited in claim 4, in which the information received from the respective renderer is in response to a message transmitted from the apparatus to the respective renderer.

6. The apparatus as recited in claim 1, in which the content identification is determined by the apparatus based on information received from the respective server.

7. An information processing method for use in an information processing apparatus connectable to a reproducing system having a number of servers and a number of renderers, comprising:
 creating history information for at least one renderer and storing the created history information in a storage, in which the history information for a respective renderer is based on content that has been previously reproduced by the respective renderer and includes information of (i) content type, (ii) content identification of the content, and (iii) server identification which identifies a server having stored therein the respective content, arranged in association with each other;
 inputting a reproduction request for a desired renderer which specifies at least a desired content type; and
 retrieving the content identification for desired content associated with the desired content type for the desired renderer from the storage and transmitting to the desired renderer a reproduction instruction which includes the retrieved content identification and the server identification wherein the desired content is stored.

8. The method as recited in claim 7, in which for the history information of at least one said renderer, the history information for only a most recently reproduced content for each said content type is stored in the storage.

9. The method as recited in claim 7, in which for the history information of at least one said renderer, the history information for a plurality of contents for each content type is stored in the storage.

10. The method as recited in claim 7, in which the content identification is determined based on information received from the respective renderer.

11. The method as recited in claim 10, in which the information received from the respective renderer is in response to a message transmitted from the apparatus to the respective renderer.

12. The method as recited in claim 7, in which the content identification is determined by the apparatus based on information received from the respective server.

13. A non-transitory computer-readable recording medium storing a computer-readable program for executing an information processing method for use in an information processing apparatus connectable to a reproducing system having a number of servers and a number of renderers, the method comprising:

creating history information for at least one renderer and storing the created history information in a storage, in which the history information for a respective renderer is based on content that has been previously reproduced by the respective renderer and includes information of (i) content type, (ii) content identification of the content, and (iii) server identification which identifies a server having stored therein the respective content, arranged in association with each other;

inputting a reproduction request for a desired renderer which specifies at least a desired content type; and retrieving the content identification for desired content associated with the desired content type for the desired renderer from the storage and transmitting to the desired renderer a reproduction instruction which includes the retrieved content identification and the server identification wherein the desired content is stored.

\* \* \* \* \*